(12) United States Patent
Dee et al.

(10) Patent No.: US 9,679,059 B2
(45) Date of Patent: *Jun. 13, 2017

(54) SYSTEMS AND METHODS FOR REMOTE ACCESS TO DB2 DATABASES

(71) Applicant: BMC SOFTWARE, INC., Houston, TX (US)

(72) Inventors: Stanley James Dee, Austin, TX (US); Anthony Louis Lubrano, Sugar Land, TX (US); Stephen Ray Cole, Elgin, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,717

(22) Filed: Nov. 17, 2015

(65) Prior Publication Data
US 2016/0070798 A1 Mar. 10, 2016

Related U.S. Application Data

(63) Continuation of application No. 13/793,365, filed on Mar. 11, 2013, now Pat. No. 9,218,401.

(51) Int. Cl.
*G06F 17/30* (2006.01)
*G06F 9/54* (2006.01)

(52) U.S. Cl.
CPC ........ *G06F 17/30864* (2013.01); *G06F 9/547* (2013.01); *G06F 17/3056* (2013.01)

(58) Field of Classification Search
CPC ........... G06F 17/3056; G06F 17/30569; G06F 17/30876

(Continued)

(56) References Cited

U.S. PATENT DOCUMENTS 7,685,122 B1 3/2010 Lubrano
8,312,465 B2 11/2012 Pierce et al.

(Continued)

OTHER PUBLICATIONS

Mark Rader; "DB2 and Workload Management (WLM): An Introduction", Baltimore/Washington DB2 Users Group, 2010 IBM Corporation, 53 pages.*

(Continued)

*Primary Examiner* — Monica Pyo
(74) *Attorney, Agent, or Firm* — Brake Hughes Bellermann LLP

(57) ABSTRACT

Systems and methods are provided that allow client programs using APIs for accessing local DB2 databases to access DB2 systems on remote logical partitions and remote zSeries mainframes rather than from a local DB2 system. For example, a method may include intercepting a DB2 request using a documented API for accessing local DB2 databases from a client program executing on a source mainframe system. The method may also include selecting a destination mainframe system and sending a buffer including information from the request from the source mainframe system to the destination mainframe system and establishing, at the destination mainframe system, a DB2 connection with the DB2 system from the request. The method may further include receiving a response from the DB2 system, sending a buffer having information from the response from the destination mainframe system to the source mainframe system, and providing the information to the client program.

21 Claims, 5 Drawing Sheets

(58) Field of Classification Search
USPC .......................... 707/705, 792, 793, 802, 803
See application file for complete search history.

(56) References Cited

U.S. PATENT DOCUMENTS

| | | |
|---|---|---|
| 2003/0204510 A1* | 10/2003 | Ball .................. G06F 17/30286 |
| 2004/0054686 A1 | 3/2004 | Hembry |
| 2004/0086153 A1 | 5/2004 | Tsai et al. |
| 2006/0095606 A1* | 5/2006 | Emmes ............... G06F 13/4022 |
| | | 710/46 |
| 2007/0089107 A1 | 4/2007 | Squires et al. |
| 2008/0271049 A1 | 10/2008 | Dinh et al. |
| 2014/0258256 A1 | 9/2014 | Dee et al. |
| 2014/0258507 A1 | 9/2014 | Lubrano |
| 2016/0072909 A1 | 3/2016 | Lubrano |

OTHER PUBLICATIONS

System Programming APIs, IMS Version 11, IBM, May 2012, pp. 305-350, 46 pages.
Krisnan, Gopal, "Leveraging zIIP, zAAP Specialty Engines with DB2 for z/OS", IBM, Dec. 2008, 54 pages.
Non-Final Office Action received for U.S. Appl. No. 13/793,568, mailed on Jan. 12, 2015, 13 pages.
Notice of Allowance received for U.S. Appl. No. 13/793,568, mailed on Aug. 28, 2015, 13 pages.
DRDA, Wikipedia, (https://en.wikipedia.org/wiki/DRDA), May 1, 2016, 2 pages.
Non Final Office Action for U.S. Appl. No. 14/943,669, mailed on Jul. 6, 2016, 16 pages.

* cited by examiner

SYSTEMS AND METHODS FOR REMOTE ACCESS TO DB2 DATABASES

RELATED APPLICATION

This application is a continuation of, and claims priority to, U.S. application Ser. No. 13/793,365, filed on Mar. 11, 2013, which is hereby incorporated by reference in its entirety.

TECHNICAL FIELD

This disclosure relates generally to the field of remote access to mainframe-based data. More particularly, but not by way of limitation, this disclosure refers to a system for accessing DB2® data from a remote mainframe.

BACKGROUND

International Business Machine Corporation (IBM) mainframes provide online transaction processing subsystems, such as Information Management System (IMS®), DB2®, and Customer Information Control System (CICS®) (IMS, DB2 and CICS are registered trademarks of IBM), that enable high-speed transaction processing of data. Each processing subsystem has file structures unique to its environment. For example, DB2 transactions access data stored in DB2 databases, IMS transactions access data stored in IMS databases, and CICS transactions access data stored in VSAM data sets. For various reasons, applications and transactions running outside of the subsystems could not originally access the data stored within the subsystem.

To allow outside access to subsystems, IBM first introduced an interface allowing CICS and IMS transactions to have high-speed access to DB2 databases on the same system or logical partition (LPAR). This interface includes documented application program interfaces (APIs) also known as DSNCLI and DSNHLI2. DSNCLI opens and closes DB2 database connections and DSNHLI2 handles SQL requests after connection. Such documented APIs require subsystems to connect to a DB2 system running on the same system or logical partition (LPAR) as the subsystem. Each LPAR is, in practice, equivalent to a separate mainframe. Thus, for an instance of, for example, CICS using the documented APIs to have access to a DB2 database, DB2 must be running on the same system as the instance of CICS. This results in multiple installations of DB2 systems at a customer site, for example on multiple LPARs within a sysplex. The costs that result from the multiple installations can be prohibitive. While IBM has introduced other interfaces that allow programs to have access to remote DB2 databases, such interfaces require a change to the business application source code. Many legacy business application programs still use the APIs for connecting to local DB2 databases.

SUMMARY

Systems and methods are provided that allow business application programs using documented application program interfaces (APIs) to local DB2 databases (e.g., connection interfaces and SQL execution interfaces, such as DSNHLI, DSNALI, DSNRLI, DSNELI, DSNCLI, DSN-WLI, etc.) and running on IBM zSeries platforms to access DB2 database data not locally available. The DB2 database data may be accessible from DB2 systems on remote logical partitions and remote zSeries mainframes anywhere in the world; using any telecommunication technology that has been implemented to allow communication between the different locations. Remote communication can be implemented, for example, via TCP/IP, VTAM/SNA, Cross-System Coupling Facility (XCF) messaging or any other, as yet undefined, telecommunication technology. Implementations provide such remote access without changing the business application's programs or configuration files, or the DB2 systems. Furthermore, some implementations allow a customer to move a DB2 subsystem from a heavily loaded LPAR to a more lightly loaded one without altering, moving, or otherwise causing outages for the applications that access the DB2 data. Some implementations also support a warm failover so that an application that accesses the moved DB2 system is automatically redirected after the moved DB2 system on the more lightly loaded LPAR comes online and the DB2 system on the heavily loaded LPAR goes offline.

In one general aspect, a mainframe computing system includes at least one general processor, a client program executing on the mainframe computing system, the client program configured to make a DB2 request using a documented API for accessing local DB2 databases, and a redirect subsystem. The redirect subsystem may be configured to intercept and normalize the DB2 request and to select a destination mainframe computing system to respond to the request. The selection may be based on a map that associates remote DB2 systems with corresponding mainframe computing systems. The redirect subsystem may also be configured to schedule a communication request directed to the destination mainframe computing system. The request may include the normalized DB2 request. The redirect subsystem may further be configured to receive a normalized response from the destination mainframe computing system, to convert the normalized response into a format appropriate for the documented API, and to provide the converted response to the client program.

Implementations of the mainframe computing system may include one or more of the following features. For example, the mainframe computing system may also include at least one zIIP processor and the redirect subsystem may be further configured to perform at least one of its operations using a zIIP eligible service request block. In some implementations, the redirect subsystem may be configured to normalize the DB2 request using a zIIP eligible service request block and to resume the zIIP eligible service request block to convert the normalized response into the documented API format. In some implementations the mainframe computing system and the destination mainframe computing system may be different logical partitions of a sysplex. In some implementations the DB2 request may specify a first DB2 system and the response from the destination mainframe computing system may be from a second DB2 system that differs from the first DB2 system. In some implementations, the first DB2 system may have been related to a new LPAR as the second DB2 system to achieve load balancing. In some implementations, intercepting the DB2 request includes intercepting a load request made by an operating system to load the client program into memory, detecting a call to the documented API, and replacing the call to the documented API with a call to the redirect subsystem. In some implementations, the DB2 request is an implicit connection request and the method further comprises scheduling a second communication request directed to the destination mainframe system, the second communication request causing the destination mainframe system to open a connection with the particular DB2 system using the documented API, and receiving a response from the destination mainframe system indicating the connection was opened. The second communication request may be scheduled prior to scheduling the first communication request.

In another aspect, a computer-implemented method includes intercepting a DB2 request from a client program executing on a source mainframe system, the request using a documented API for accessing a local DB2 database, and selecting a destination mainframe system to respond to the request. The selection of the destination mainframe may be based on a DB2 system identified in the request and on a map that associates remote DB2 systems with corresponding mainframe systems. The method may also include sending a buffer including information from the request from the source mainframe system to the destination mainframe system and establishing, at the destination mainframe system, a connection with the DB2 system identified in the request. The method may also include receiving a response from the DB2 system, sending a buffer having information from the response from the destination mainframe system to the source mainframe system, and providing the information to the client program in a format appropriate for the documented API.

Implementations may include one or more additional features. For example, the method may also include determining, at the destination mainframe system, that the DB2 system identified in the request cannot process the request and establishing, at the destination mainframe system, establishing a DB2 connection with another DB2 system that is in a data sharing group with the DB2 system identified in the request.

In another aspect, a destination mainframe system includes at least one general processor, a DB2 subsystem including DB2 executable code, and a redirect subsystem. The redirect subsystem may be configured to notify a source mainframe system of the existence of the DB2 subsystem on the destination mainframe, where the source mainframe lacks DB2 executable code. The redirect subsystem may also be configured to receive a first buffer from the source mainframe system, the first buffer including information from a DB2 request that identifies the DB2 subsystem in a normalized format and convert the information to a format used by a documented API for accessing a local DB2 database. The redirect subsystem may further be configured to connect to the DB2 subsystem using the documented API, and make the request to the DB2 subsystem using the documented API. The redirect subsystem may further be configured to receive a response from the DB2 subsystem in a format appropriate for the documented API, generate a second buffer having information from the response in the normalized format, and send the second buffer to the source mainframe system.

In some implementations, the destination mainframe system may also include at least one lower cost processor and the redirect subsystem may be configured to perform at least some of the operations using a service request block eligible to run on the lower cost processor. In some implementations, the request may specify a data sharing group and the mainframe system includes the data sharing group. In such implementations, the DB2 subsystem may be one of a plurality of DB2 subsystems in the data sharing group and the redirect subsystem may be further configured to determine that the DB2 subsystem identified in the request is unavailable and queue the second buffer to a DB2 connection task with another DB2 subsystem from the plurality of DB2 subsystems. Thus, the response may be received from the other DB2 subsystem. In some implementations, the normalized format is a DSNALI connection format and converting the information includes adjusting pointers in the first buffer.

In one general aspect, a computer program product being tangibly embodied on a computer-readable storage device stores instructions that, when executed by at least one processor causes a computer system to perform any of the disclosed methods.

One or more of the implementations of the subject matter described herein can be implemented so as to realize one or more of the following advantages. As one example, a redirection system eliminates the technical requirement of having a DB2 system or DB2 executable code present on the same system, for example a Logical Partition (LPAR), as the client application programs, such as CICS, IMS, or batch programs, that use the DSNALI connection interface. In other words, the redirection system allows client application programs that currently can only connect to a locally executing copy of a DB2 system to connect with a remote DB2 system. This may be especially important for legacy business application programs that are difficult or impossible to modify. Because the redirection system does not require DB2 to be installed on the same system as CICS, a customer can reduce the number of LPARs with DB2 executable code within a sysplex. The reduction in the number of LPARs with DB2 executable code simplifies DB2 software maintenance strategies and reduces license charges for the customer. This has the effect of lowering customer costs in terms of both people and software.

As another example, the redirection system also provides functionality not currently available to client programs, such as CICS and IMS subsystems. For example, a client program can request data from a data sharing group, even though a DB2 system is not running on the same system as the client program. Furthermore, if a client program requests data from a specific DB2 system and the specific DB2 system is not responding, the redirection system may select another DB2 system from the data sharing group to process the request. Similarly, the redirection system allows a customer to move a DB2 subsystem from a heavily loaded LPAR to another more lightly loaded one without altering or moving the applications that access the DB2 data. The details of one or more implementations are set forth in the accompanying drawings and the description below. Other features will be apparent from the description and drawings, and from the claims.

DETAILED DESCRIPTION

Disclosed implementations replace the current local DB2 access interface with a redirection subsystem that initiates remote DB2 services and provides a communication link for DB2 database requests. The redirection subsystem can be used with application programs running on other mainframe subsystems, such as CICS and IMS, or with application programs running in batch or TSO, that use a documented API for accessing a local DB2 database. Such APIs include, but are not limited to DSNALI, DSNHLI2, DSNRLI, DSNELI, DSNCLI, DSNWLI, or other interfaces later created for connecting to a DB2 database on the same system as the application program. The processes that use the DB2 local-access interface are considered client programs. The redirection subsystem uses the documented DB2 database local-access interface to provide a transparent request/response mechanism for the client programs. In other words, the requesting client program does not know the DB2 subsystem it receives data from is remote, and the DB2 subsystem responding to the request does not know that the request came from a different LPAR or a different mainframe. As discussed above, this allows fewer installations of DB2, redundancy, and load-balancing all without changes to the client programs themselves. This can be especially important for allowing legacy programs, for which source code can be unavailable or undesirable to modify, to take advantage of lower operating costs and fewer outages.

Figure 1:
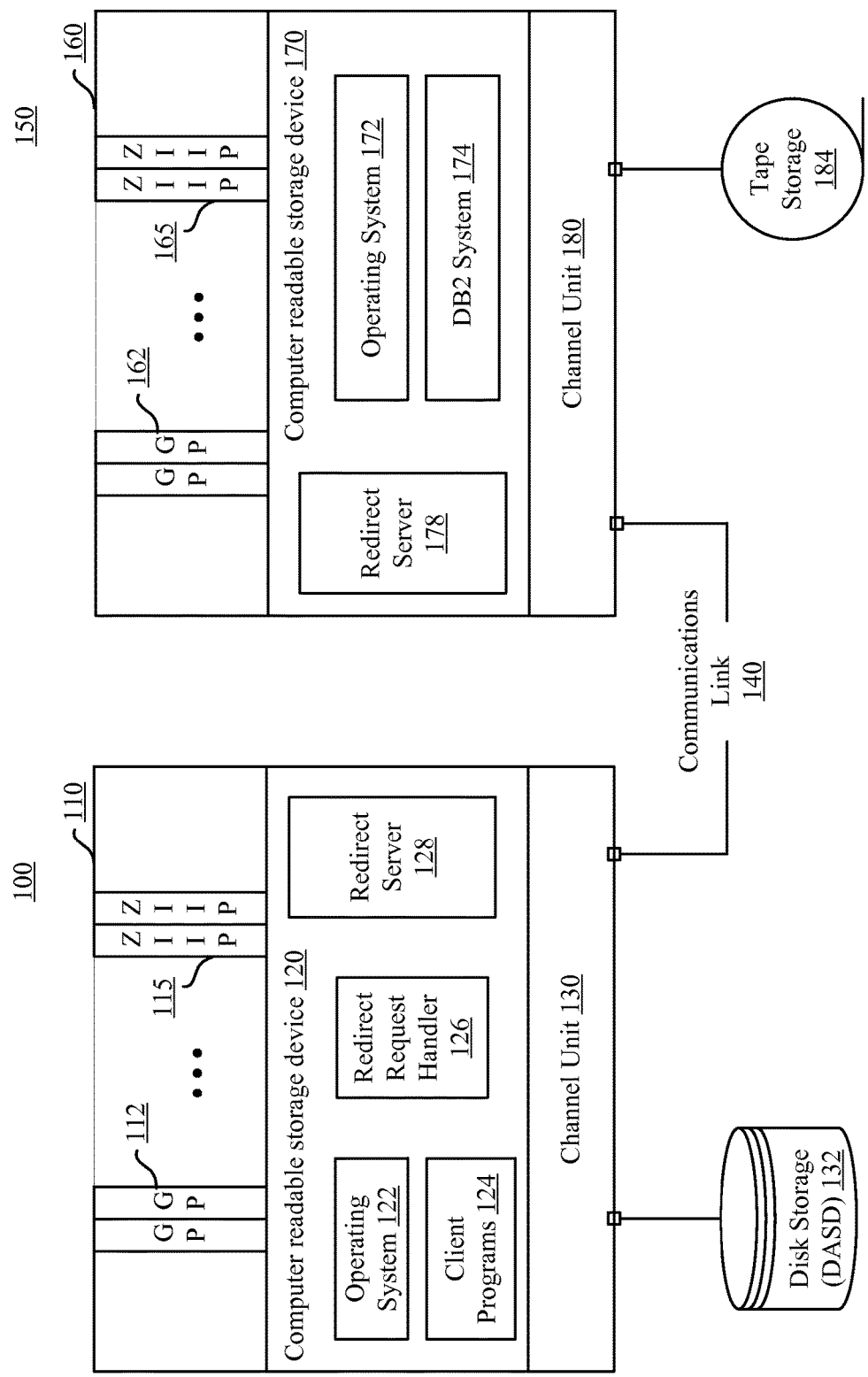
FIG. 1 is a block diagram that illustrates an exemplary IBM mainframe with remote DB2 access, in accordance with some implementations.

FIG. 1 illustrates a high level block diagram of an exemplary IBM mainframe with remote DB2 access. FIG. 1 illustrates two mainframe computing systems 100 and 150. Mainframe computers are large, multi-processor computing devices able to perform thousands of tasks every second. Because of their large size and processing power, usage of processing time is often tracked and customers are billed based on their processor usage. In some implementations system 100 and system 150 are two LPARs in a sysplex. An LPAR is a logical segmentation of a mainframe's memory and other resources that allows it to run its own copy of an operating system and associated applications, making the LPAR, in practice, equivalent to a separate mainframe. Accordingly, processing may be billed separately for each LPAR, depending on its configuration. LPARs may be enabled via special hardware circuits or purely through software. A system administrator can assign one or more system processors for the exclusive use of an LPAR. Alternately, the administrator can allow all processors to be used on some or all LPARs. LPAR's may also allow multiple system images (of the same operating system or different operating systems) to run in one machine. Furthermore, each LPAR can execute one or more subsystems within an operating system. A sysplex is a collection of LPARs that cooperate to process work. Processes running on LPARs in a sysplex can communicate with each other without a subsystem (e.g., CICS, IMS, DB2, etc.) control region using Cross-system Coupling Facility ("XCF") communications. In some implementations system 100 and system 150 may be mainframes that are physically and logically distinct from and/or geographically separated from one another. Although shown in FIG. 1 as IBM zSeries® mainframes, implementations are not so limited (zSeries is a registered trademark of the IBM Corporation). Thus, although referred to as mainframe computing system 100 and mainframe computing system 150, it is to be understood that mainframe computing system 100 and mainframe computing system 150 may be logical partitions of a single physical mainframe computer.

The mainframe computing systems 100 and 150 can include one or more processors configured to execute one or more machine executable instructions or pieces of software, firmware, or a combination thereof. In some implementations, the processor frame, such as frame 110 and 160, may include a plurality of General Processors (GPs) (112 and 162) and a plurality of zSeries Integrated Information Processors (zIIPs) (115 and 165). The operating system, such as operating system 122 or 172, may run all workloads on the GPs but may only run certain workloads on the zIIPs. The general processor has a run-time cost associated with the amount of workload it performs. Workload and capacity of mainframe systems is generally measured in MIPS (Millions of Instructions Per Second). Based on the amount of capacity purchased or licensed by a customer, the capacity of the GP may be "throttled down" such that it is not running at the top of its technically available processing capability. A zSeries mainframe may also include one or more zSeries Integrated Information Processors (zIIPs). The zIIPs are intended to offload work from the general processors of the mainframe computer system. Workloads running on a zIIP processor generally run either for free or at a fraction of the price of the GP. These processors generally do not contain microcode or hardware features that accelerate their designated workload. In other words, a zIIP is typically configured to run at its full speed because the pricing structure does not directly depend on the throughput of this type of processor. Thus, a zIIP is financially different from a GP because unlike workloads performed by the GP, the zIIP permits increasing system capacity for targeted workloads without raising software license fees. Thus, a zIIP may be considered a lower-cost processor. However, only workloads defined by IBM as zIIP-eligible can execute on a zIIP. Generally, workloads scheduled using a zIIP eligible service request block (SRB) are considered zIIP eligible.

The mainframe computing systems 100 and 150 may also include one or more computer readable storage devices, such as devices 120 and 170. The computer readable storage devices may include main memory, cache, or disk storage, configured to store data and/or applications, either temporarily, permanently, semi-permanently, or a combination thereof. The storage devices may include volatile memory, non-volatile memory, or a combination thereof. The mainframe computing systems 100 and 150 can include an operating system, such as operating system 122 and operating system 172. The operating system can be the z/OS operating system or some other mainframe operating system. The mainframe computing system 100 may include one or more client programs 124. Client programs 124 may include any code written to execute on the mainframe computing system 100. For example, client programs 124 may include mainframe subsystems, such as CICS, IMS, and Resource Access Control Facility (RACF), vendor-supplied business application programs, and proprietary programs.

The mainframe computing system 100 may also include a redirect request handler 126 and a redirect server 128, which together comprise a redirection subsystem. The redirect request handler 126 may intercept a DB2 request made by a client program running in CICS or batch. The client program may set up the DB2 request as if using a documented API for accessing a local DB2 database, and may have no indication that the request will be handled by the redirect request handler 126 rather than the programmed access interface. The redirect request handler 126 may receive the request and schedule a zIIP eligible service request block (SRB) that allows the redirect server 128 to normalize the data from the request, determine where to send the request, and to initiate transport of the request to the determined server, as will be explained in more detail below. Redirect server 128 may be configured as a client-side server that forwards requests to a server-side redirect server and processes a response received from the server-side redirect server.

The mainframe computing system 150 may include a redirect server 178. The redirect server 178 may be configured as a server-side redirect server that receives a DB2 request from a client-side redirect server, selects a DB2 system to process the request, to set up the environment for DB2 to receive, process, and respond to the request, and to send the response from the DB2 system back to the client-side redirect server. In some implementations, redirect server 128 and redirect server 178 may be configured to serve as both a client-side and a server-side redirect server. In other words, redirect server 128 may also be configured to act as redirect server 178, and redirect server 178 may be configured to act as redirect server 128. Mainframe computing system 150 may also include one or more DB2 systems 174. In some implementations, the DB2 system 174 may be part of a DB2 data sharing group that has access to the same set of DB2 databases.

In some implementations, the mainframe computing system 100 and mainframe computing system 150 may also include a channel unit, such as channel unit 130 and channel unit 180, for processing Input/Output (I/O) requests. The channel unit may include a communications link 140, which may be a telecommunications link, a network interface, a communication bus, or some other communication link. For example, mainframe computing system 100 and mainframe computing system 150 may communicate with each other using XCF, TCP/IP, SNA, or other communication protocols over communications link 140. The channel unit may also include a tape storage unit 184 and/or a disk storage device 132 sometimes referred to as a Direct Access Storage Device (DASD). In some implementations, mainframe computing system 100 may include one or more other hardware components not shown in FIG. 1, such as for example, a display or monitor, a keyboard, a touchscreen, a camera, a mouse, a touchpad, a trackpad, a video processor, etc., through which a user may send data to and receive data from mainframe computing system 100 or mainframe computing system 150. In some implementations, the user may use a second computing device (not shown) in communication with mainframe computing system 100 via a communications network to send data to and receive data from mainframe computing system 100. The user may also communicate with mainframe computing system 150 in a similar manner.

Figure 2:
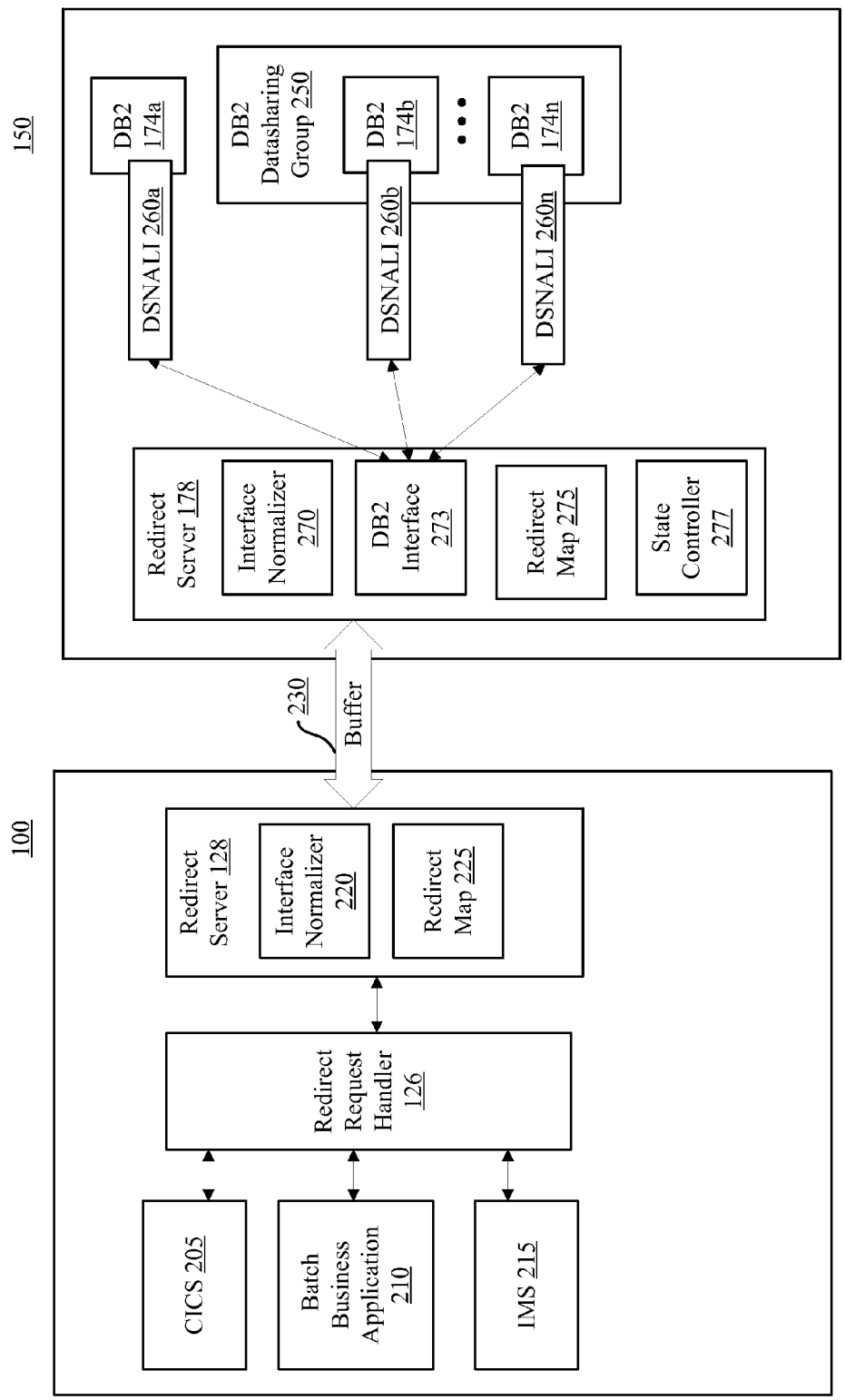
FIG. 2 is a block diagram illustrating example modules within the DB2 redirect subsystems of the mainframes of FIG. 1, in accordance with some implementations.

FIG. 2 is a block diagram that illustrates example modules within the DB2 redirection subsystems of the mainframes of FIG. 1, in accordance with some implementations. In the example of FIG. 2, the client programs 124 of FIG. 1 include CICS 205, batch business application 210, and IMS system 215. Each client program may initiate one or more DB2 database requests, which are handled by the redirect request handler 126 instead of the documented API for accessing local DB2 databases used by the client program. Some examples of DB2 requests include load and call requests for connecting to a DB2 system and load and call requests for executing SQL statements on the DB2 system, although other types of requests are possible. Sometimes, a client program may make an implicit connection request to a DB2 system. An implicit connection is a connection to a DB2 database first triggered by an SQL call. For example, a client program may make an SQL call, for example using DSNHLI2 without an open or load DSNALI request. After receiving an implicit request, the redirect request handler may try to connect to the DB2 system before processing the SQL request. The requests to documented API interfaces for local DB2 databases may be intercepted by the redirect request handler. For example, a mainframe administrator may replace the connection and SQL call APIs with a reference to the redirect request handler 126. Replacing the connection may involve intercepting a LOAD SVC and replacing the redirect request handler as proxy for the DB2 API. Another method of intercepting the DB2 API calls can be concatenating a library for the redirect quest handler 126 in the execution sequence for the subsystem region, for example CICS, IMS, etc. The execution sequence may be specified in a configuration file for the subsystem or in Job Control Language (JCL). Intercepting the connection and SQL call APIs this manner means none of the application programs require a change to their code or to their configuration files because the calls to the DB2 interface routines made by the application programs are intercepted by the redirect request handler 126.

In setting up the environment to connect to DB2, the documented APIs use some specific parameters. For example, each request can include a SQLPARMS control block, an SQL communications area (SQLCA) control block, and an SQL descriptor area (SQLDA) control block, all of which contain information for accessing DB2 database data and are documented by IBM. A control block, or just block, is a memory structure that stores data about a specific entity and may have addresses, or pointers, to still other blocks. The redirect request handler 126 may keep track of each request, the process that made the request and manipulate the control blocks created by the request. The DB2 request may also include an input-output area for receiving the data from DB2. Although each of these elements is generally present in a DB2 request from any client program, each client may arrange the elements in a different format.

Figure 3:
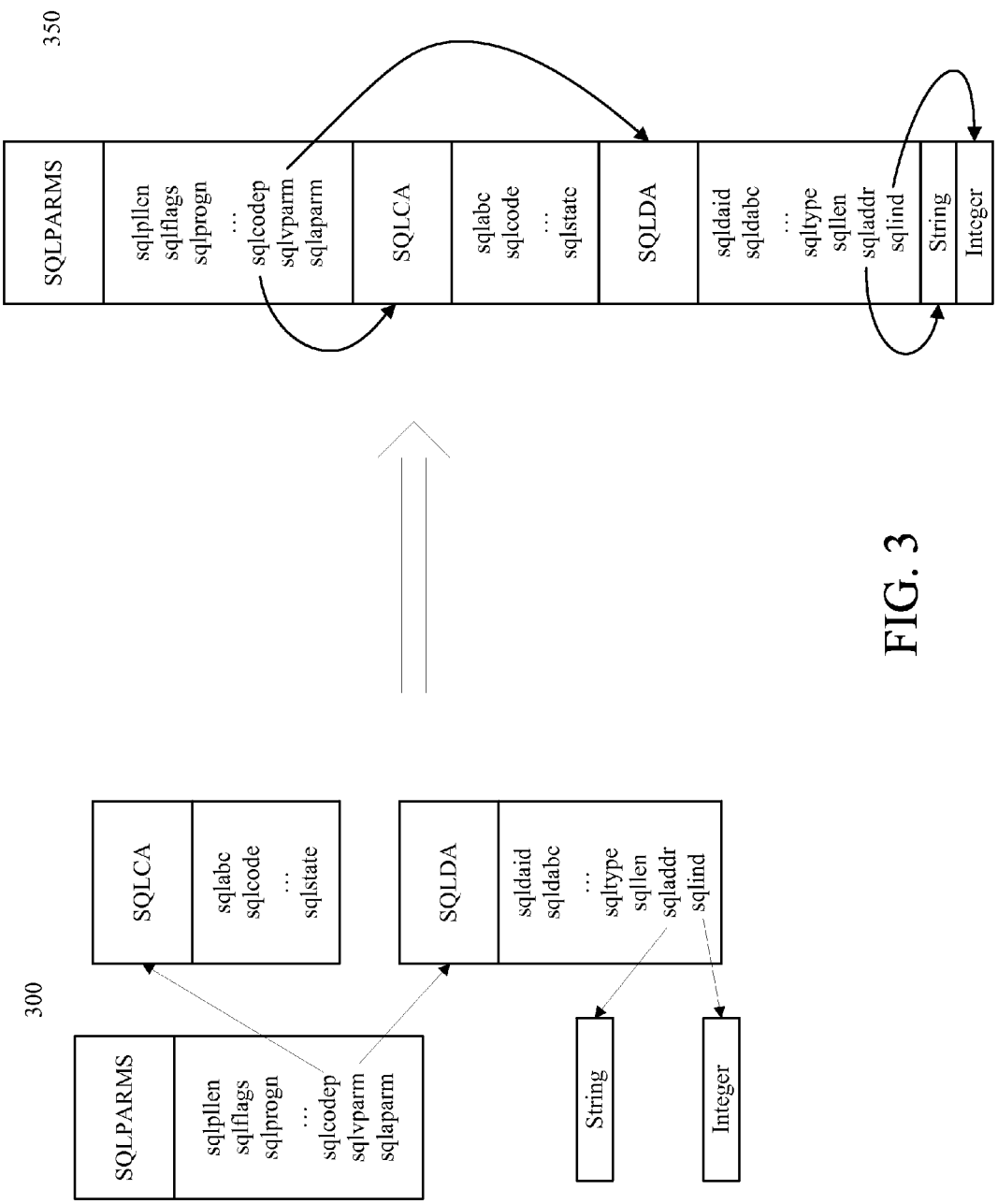
FIG. 3 is an example of a normalized data for a redirected DB2 request, according to an implementation.

Once the redirect request handler 126 receives a DB2 request, it may schedule a zIIP eligible SRB that invokes the redirect server 128. Running the tasks of the redirect server 128 on a zIIP processor saves cost, as explained above. Creating the SRB as zIIP eligible does not guarantee that the tasks run on a zIIP processor rather than a GP processor, but makes it possible to do so. The redirect server 128 may include an interface normalizer 220 that takes the DB2 request from the client program and normalizes the data in the request so that all data communicated between client-side and server-side redirect servers have the same format, regardless of the format used by the client program. As mentioned above, the normalization process may be scheduled using a zIIP eligible SRB to keep processing costs down. In some implementations, normalization may include deep copying the request parameters for each DB2 interface into a single control block. Deep copying means copying all control blocks referenced by the interface parameters. FIG. 3 illustrates an example of request control blocks 300 and the normalized (deep copy) control block 350 communicated between the redirect request server 128 and redirect request server 178.

The redirect server 128 may also include a redirect map 225. The redirect map 225 may enable redirect server 128 to determine the destination system for the request. The destination system is the mainframe computing environment that is running the DB2 subsystem requested by the client program. Each redirect server may notify the other redirect servers about the DB2 environments that it services. For example, redirect server 178 may inform redirect server 128 that it has access to a number of DB2 environments including DB2 174a and a data sharing group 250 that includes n DB2 systems, namely DB2 174b to DB2 174n. When redirect server 128 receives this information it may create or update redirect map 225, so that it knows that client programs requesting access to, for example, DB2 system 174a should be directed to mainframe computing system 150. If redirect server 128 has access to any DB2 systems, it may also report these systems to, for example, redirect server 178 and redirect server 178 would store this information in redirect map 275.

When redirect server 128 determines where to send the normalized request, it may send the request to the destination system using any number of communication protocols. For example, if mainframe computing system 100 and mainframe computing system 150 are LPARs within the same sysplex, the redirect server 128 may send the request using XCF, which is a high-speed communications protocol for LPARs within a sysplex. If mainframe computing system 100 and mainframe computing system 150 are geographically remote, redirect server 128 may send the request using TCP/IP or Systems Network Architecture (SNA) protocols.

When redirect server 178 receives a request, it may de-normalize the request and use the information in connecting with the appropriate DB2 system. For example, redirect server 178 may include interface normalizer 270, which may take the buffer 230 received from redirect server 128 and place the normalized data into a format expected by a documented same-system DB2 connection interface. In some implementations the normalized data may be in a documented same-system DB2 connection format, and interface normalizer 270 may only need to adjust some pointers as part of the de-normalization. The redirect server 178 may also include a DB2 interface 273 that establishes a DB2 connection and sends a request to the DB2 system. Each DB2 subsystem may have its own version of the API connection facilities, as illustrated in FIG. 2 by items 260a and 260b to 260n using the DSNALI facility as an example. Although shown in FIG. 2 as a DSNALI connection, this is one example of a DB2 connection and implementations may other existing or newly created local DB2 connection interfaces.

The redirect server 178 may also include state controller 277. State controller 277 may maintain state information from an application program about each connection to DB2 that it controls to handle failures, timeouts, etc. State information may include address spaces, pointers, and event control blocks from a client program that are needed to connect to DB2. As an example, state information may include a DB2 termination ECB, a start ECB, a declaration pointer, an EIB pointer, RRS context, primary and second authorizations, a Host, ASID, and context combination for the client application, which are documented by IBM. Such information may be passed from redirect server 128 to redirect server 178 as part of the request. In addition, redirect server 178 may generate or receive a request identifier to assist the redirect server 178 in directing a request back to the correct requesting client. For example, the request identifier may be a combination of an LPAR identifier and a TCB identifier or an LPAR identifier and a combination of Host, ASID, and context. In some implementations, the state information may include information about the status of each open cursor. A cursor is a data structure used by a business application to access a row of data from a database. Thus, the state controller 277 may store information about the table, view, and row number for the open cursors of each business application.

The DB2 interface 273 may determine which of the DB2 subsystems to invoke and may establish the DB2 connection using the de-normalized request and connect to the appropriate DB2 system. In other words, the redirect server 178 may use the documented API for local DB2 databases to establish the DB2 connection or to make SQL calls. This ensures that no changes are needed in the DB2 system to make the DB2 system available remotely. The DB2 system may process the request and send back a response through the appropriate API. The response may include the data requested and, optionally, other information such as statistics, state, or status information. The documented API may pass the response back to the DB2 interface 273. The DB2 interface 273 may schedule a zIIP eligible SRB to construct the response buffer, which includes normalizing the response, and may send the response buffer back to the requesting system. The response buffer may be communicated back to the requesting system using the communication protocol used to receive the request.

When the redirect server 128 of mainframe computing system 100 receives the response, the redirect server 128 may resume the zIIP eligible SRB that was used to send the request. Upon resumption, the redirect server 128 may de-normalize the data and reconstruct the response areas, placing the response into a format expected by the client program. The redirect server 128 may pass the de-normalized response area back to the redirect request handler 126, which provides the response to the client program.

Figure 4:
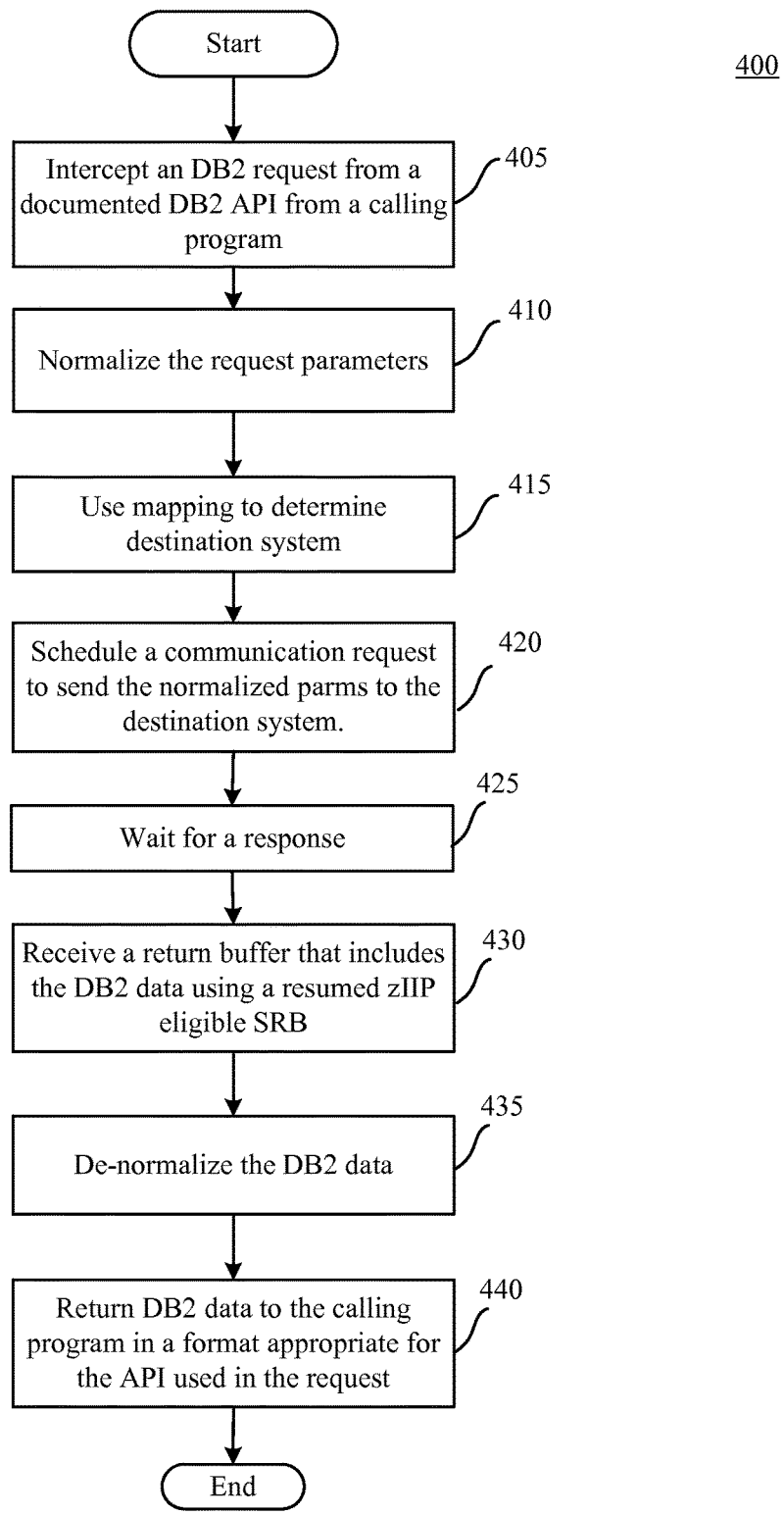
FIG. 4 is a flowchart illustrating a client-side process for accessing a remote DB2 database, according to an implementation.

FIG. 4 is a flowchart of a client-side method 400 for accessing a remote DB2 database, according to an implementation. In one implementation, process 400 may be invoked by a client program running on a zSeries® mainframe, such as mainframe computing system 100 shown in FIG. 1. In some implementations, process 400 may be performed by a client-side redirection subsystem, such as redirect request handler 126 and redirect server 128 of FIGS. 1 and 2. The client program may be a program from a mainframe subsystem such as CICS or a batch business application, or some other process that uses any documented DB2 database request format, to access DB2 database data. Examples of documented APIs for accessing local DB2 databases include, but are not limited to, DSNALI, DSNHLI2, DSNHLI, DSNRLI, DSNELI, DSNCLI, and DSNWLI.

At 405, the redirect request handler 126 may intercept a DB2 request made by the client program. Several interfaces allow access to DB2 subsystems. Some examples are CICS, IMS, TSO, Call (CAF), Resource Recovery Services (RRSAF), and the DB2 utility connection facility. The redirect request handler has an interface for each type of access. For example, a LOAD SVC routine may replace loads of documented DB2 interface routines with routines from the redirect request handler. This may result in the DB2 interface routines executing in the client application address spaces and passing all DB2 requests to the redirect request handler. In one implementation, a database administrator may configure the client program environment to redirect a DB2 request otherwise sent to a documented API for accessing local DB2 systems, such as DSNALI or DSNHLI2, to the redirect request handler by putting the redirect library ahead of the API libraries and bouncing the application, e.g., CICS, region as part of a CICS install or update. Other systems may be configured in a similar manner.

The DB2 request may include state information and parameters that identify the DB2 system to which the request is directed. In some implementations, the redirect request handler 126 may schedule a zIIP eligible SRB that invokes the redirect server. The redirect server may normalize the request parameters, creating a request buffer to send to a destination system (410). Normalization may allow the request buffer to be transmitted in a contiguous data structure to expedite transmission of the data. The redirect server may determine a destination system based on a mapping of DB2 systems to computing systems (415). For example, a redirect server running on a particular mainframe may report the DB2 systems that are running on the same particular mainframe to other redirect servers. Each redirect server that receives this information may create a mapping that allows the redirect server to determine which system has the DB2 system identified in the request. The redirect server may then schedule a communication request, which causes the normalized buffer to be sent to the destination system (420). Once the request is scheduled, in some implementations, the SRB associated with the request may be paused so that it can be resumed when the response is received. The redirect server may then wait for the response (425).

When the destination system returns the response, the redirect server may receive the return buffer (430). The return buffer may include the data from the DB2 system and, in some implementations, other data such as statistics relating to the response. In some implementations, the SRB used to send the request may be resumed to handle the processing of the response. At 435 the redirect server may de-normalize the DB2 data in the return buffer, placing the data in a documented API format expected by the client program that initiated the request. For example, DB2 requests initiated using DSNALI may differ in format from DB2 requests initiated by DSNRLI, etc. Thus, the redirect server may format the normalized request it received into a format corresponding to the documented API used by client program that issued the request. As explained above, the task that performs the data manipulation of de-normalization may use a zIIP eligible SRB. The redirect server may pass the de-normalized data to the redirect request handler, which provides the response to the client program that initiated the request (440). The response may be in a format used by the API identified in the client program to make DB2 request, so that the client program is not aware that the request was intercepted by the redirect request system. Thus, the redirect request handler and redirect server allow remote access to DB2 data without changes to the underlying requesting programs.

Figure 5:
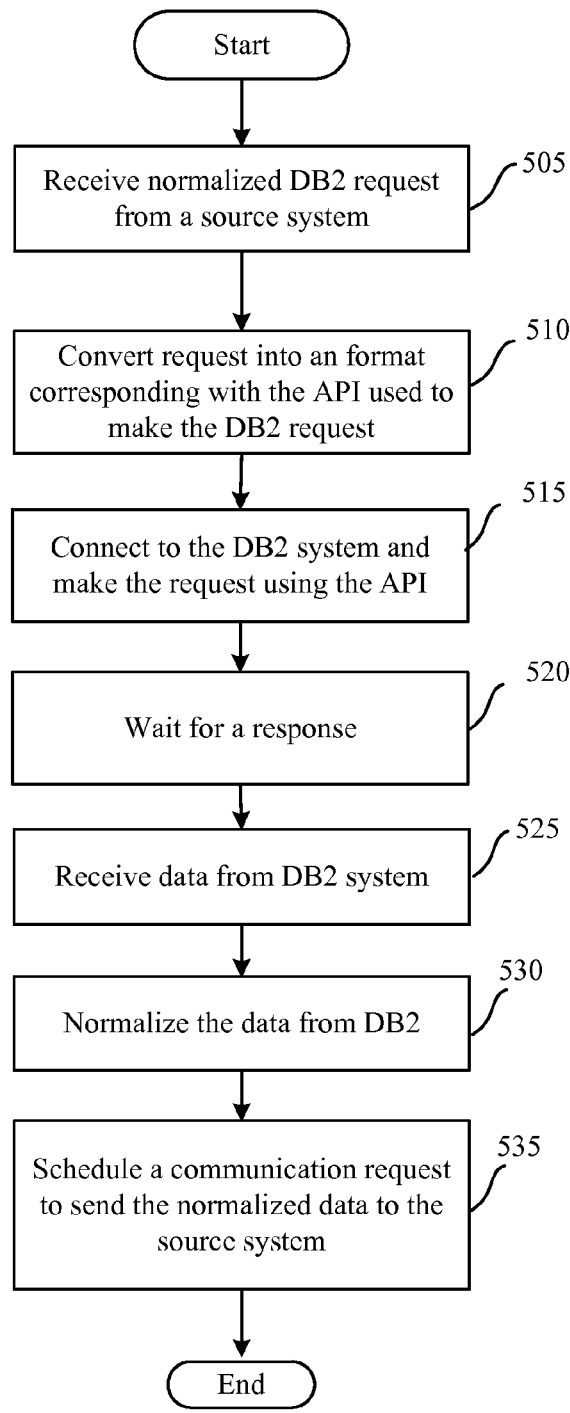
FIG. 5 is a flowchart illustrating a server-side process for responding to a client-side request for remote access to a DB2 database, according to an implementation.

FIG. 5 is a flowchart illustrating a server-side process 500 for responding to a client-side request for remote access to a DB2 database, according to an implementation. A redirect server running on a mainframe with a DB2 system, such as redirect server 178 of FIGS. 1 and 2 may perform process 500 after receiving a DB2 request from a client-side (or requesting) redirect server. At 505 the redirect server may receive a normalized DB2 request from a source system. The source system may be a mainframe system running a client program, such as in batch mode or as a CICS or IMS transaction, that requests access to a DB2 system. The source system is remote from the system running the DB2 system. For example, the source system may be an LPAR different than the LPAR running the DB2 system, or the source system may be a different mainframe than the mainframe running the DB2 system. In some implementations, redirect server may establish a DB2 connection with the DB2 system using the API of the calling program. For example if the requesting program issued a call or load DSNALI, the redirect server may establish a DSNALI connection. Likewise, if the requesting program issued a call or load DSNHLI2, the redirect server may establish a DSNHLI2 connection. In some implementations, the redirect server may connect with DB2 using RRSAF, no matter what API initiated the request. For example, to account for implicit connection requests, the redirect server may issue a connection request prior to handling the SQL request that triggered the implicit connection, or the redirect server may always connect using RRSAF.

In some implementations, the redirect server may select a different DB2 system than the DB2 system requested by the business application program. For example, the requested DB2 system may be part of a data sharing group. In this circumstance, if the requested DB2 system is unavailable, the redirect server may substitute another DB2 system from the data sharing group to process the request. This allows for redundancy not currently available to applications connecting to DB2 systems directly through DSNALI. Furthermore, the redirection system of client-side and server-side redirect servers allows different transactions within a single CICS or IMS application to connect to different DB2 systems. Each transaction may specify a different DB2 system in making the DB2 request. This ability is also not available under current DB2 access methods.

In some implementations, the redirect server may enable load balancing by allowing a customer to move a DB2 subsystem without outages to the applications using the DB2 subsystem. For example, if the DB2 subsystem is running on a first LPAR that is loaded enough that Service Level Agreements are at risk, a systems administrator may begin moving the DB2 system to a second LPAR that has unused capacity. For example, the DB2 system on the first LPAR may be quiesced, taken offline, and then brought back online on the second LPAR. The maps at the redirect servers may be updated to reflect that the DB2 system is now located on the second LPAR so that intercepted requests can be directed to the second LPAR. All this can be accomplished without modifying the applications, taking the applications offline, or losing transactions.

In some implementations, the redirect server may de-normalize the request into a format used by the API used by the client program to make the DB2 request, such as a DSNALI or DSNRLI (510). For example, in some implementations the normalized data may be in a DSNALI connection format and the redirect server may only need to change pointers in the normalized data to send the request to DB2. In other implementations, the redirect server may reformat the data of the normalized request into a DB2 connection format, such as the DSNRLI connection format, before connecting to the selected DB2 system and making the request (515). The documented API then functions as it currently does, sending the request to the DB2 system and waiting for a response (520). When the DB2 system has completed its processing, the DB2 system may send the response back to the redirect server via the API used to connect to the DB2 system. Thus, the redirect server receives the response from the DB2 system (525). The response may include data from the DB2 system as well as other information, such as status information relevant to the request. The redirect server may then normalize the response (530). In some implementations, this may involve adjusting pointers and in some implementations this may also involve rearranging the data in the response. In some implementations, the normalization tasks may be performed using a zIIP eligible SRB. The redirection server may then schedule a communication request that sends the normalized data in the buffer to the source system (535). Process 500 then ends.

Implementations of the various techniques described herein may be implemented in digital electronic circuitry, or in computer hardware, firmware, software, or in combinations of them. Implementations may implemented as a computer program product, i.e., a computer program tangibly embodied in an machine-readable storage device (e.g., a tangible computer-readable medium that does not include a propagating signal), for processing by, or to control the operation of, data processing apparatus, e.g., a programmable processor, a computer, or multiple computers. In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers, such as a storage device, suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks but do not include transitory propagating signals. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a mainframe or data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A source mainframe computing system comprising:
at least one general processor;
a client program executing on the mainframe computing system, the client program configured to make a DB2 database request using a call to a documented application program interface (API) for accessing local DB2 databases; and
a redirect subsystem configured to perform operations comprising:
intercepting the call to the documented API,
copying control blocks referenced by the documented API parameters in the DB2 request into a contiguous data structure, the control blocks including state information for the client program,
selecting a destination mainframe computing system to respond to the request, the selection being based on a map that associates remote DB2 database subsystems with corresponding destination mainframe computing systems,
scheduling a communication request directed to the destination mainframe computing system, the request including the contiguous data structure,
receiving a normalized response from the destination mainframe computing system,
converting the normalized response into a format appropriate for the documented API, and
providing the converted response to the client program,
wherein the source mainframe lacks DB2 executable code.

2. The mainframe computing system of claim 1, wherein the state information further includes event control blocks, primary authorizations, and secondary authorizations.

3. The mainframe computing system of claim 1, wherein the DB2 database request specifies a first DB2 database subsystem and the response from the destination mainframe computing system is from a second DB2 database subsystem, the first DB2 database subsystem differing from the second DB2 database subsystem.

4. The mainframe computing system of claim 1, wherein intercepting the call to the documented API includes redirecting a LOAD SVC to a redirect request handler in the redirect subsystem.

5. The mainframe computing system of claim 1, wherein intercepting the call to the documented API includes concatenating a library for a redirect request handler in the redirect subsystem in an execution sequence for a subsystem region in which the client program executes.

6. The mainframe computing system of claim 5, wherein the execution sequence is specified in a configuration file for the subsystem region.

7. The mainframe computing system of claim 5, wherein the execution sequence is specified in job control language.

8. The mainframe computing system of claim 1, wherein intercepting the call to the documented API includes:
intercepting a load request made by an operating system to load the client program into memory;
detecting a call to the documented API; and
replacing the call to the documented API with a call to the redirect subsystem.

9. The mainframe computing system of claim 1, wherein the DB2 database request from the client is an implicit connection request and the redirect subsystem is further configured to perform operations comprising, prior to scheduling the communication request:
scheduling a communication request directed to the destination mainframe system, the communication request causing the destination mainframe system to open a connection with the DB2 database subsystem using a documented API; and
receiving a response from the destination mainframe system indicating the connection was opened.

10. A computer-implemented method comprising:
intercepting, at a source mainframe system, a call to a documented application program interface (API) for accessing a local DB2 database from a client program executing on the source mainframe system, the call including a DB2 database request;
copying control blocks referenced by the documented API parameters in the DB2 request into a contiguous data structure, the control blocks including state information for the client program;
selecting a destination mainframe system to respond to the request, the selection being based on a particular DB2 database subsystem identified in the request and on a map that associates remote DB2 database subsystems with corresponding destination mainframe systems;
sending a buffer including the contiguous data structure from the source mainframe system to the destination mainframe system;
recording the state information for the client program, the state information including information about open cursors for the client program;
establishing, at the destination mainframe system, a connection with the particular DB2 database subsystem using the state information;
sending the request to the particular DB2 database subsystem using the documented API; receiving a response from the particular DB2 database subsystem; sending a buffer having the response from the destination mainframe system to the source mainframe system; and
providing, at the source mainframe system, the response to the client program in a format appropriate for the documented API,
wherein the source mainframe lacks DB2 executable code.

11. The method of claim 10, wherein the request from the client is an implicit connection request and the method further comprises, prior to sending the buffer from the source mainframe to the destination mainframe:
sending a buffer including information used to connect to the particular DB2 database subsystem from the source mainframe system to the destination mainframe system; and opening, at the destination mainframe system, a connection with the particular DB2 database subsystem using a documented API.

12. The method of claim 10, wherein the method further comprises:
determining, at the destination mainframe system, that the particular DB2 database subsystem cannot process the request; and
establishing, at the destination mainframe system, a DB2 database connection with another DB2 database subsystem that is in a data sharing group with the particular DB2 database subsystem.

13. The method of claim 10, wherein the source mainframe system is a first logical partition (LPAR) of a sysplex and the destination mainframe system is a second LPAR of the sysplex and the buffer is sent using Cross-System Coupling Facility (XCF) messaging.

14. The method of claim 10, wherein the state information also includes event control blocks for the client program.

15. The method of claim 10, wherein the state information includes a request identifier.

16. The method of claim 10, wherein intercepting the call to the documented API includes:
intercepting a load request made by an operating system to load the client program into memory;
detecting a call to the documented API; and
replacing the call to the documented API with a call to the redirect subsystem.

17. A destination mainframe system comprising:
at least one general processor;
a DB2 database subsystem including DB2 database executable code; and
a redirect subsystem configured to perform operations comprising:
notifying a source mainframe system of the existence of the DB2 database subsystem on the destination mainframe,
receiving a first buffer from the source mainframe system, the first buffer including information from a DB2 database request that identifies the DB2 database subsystem in a normalized format, wherein the source mainframe lacks DB2 executable code,
converting the information to a format used by a documented API for accessing a local DB2 database,
recording state information for a client program running on the source mainframe system that made the DB2 database request, the state information including information about open cursors for the client program,
connecting to the DB2 database subsystem using the documented API and state information,
making the request to the DB2 database subsystem using a documented DB2 database API,
receiving a response from the DB2 database subsystem in a format appropriate for the documented API,
generating a second buffer having information from the response in the normalized format, and
sending the second buffer to the source mainframe system.

18. The mainframe system of claim 17, wherein documented API used to connect to the DB2 database differs from the documented API received in the first buffer.

19. The mainframe system of claim 17, wherein the request specifies a data sharing group and the DB2 database subsystem is one of a plurality of DB2 database subsystems in a data sharing group, and wherein the redirect subsystem is further configured to:

determine that the DB2 database subsystem is unavailable; and queue the second buffer to a DB2 database connection task with another DB2 database subsystem from the plurality of DB2 database subsystems, wherein the response is received from the another DB2 database subsystem.

20. The mainframe system of claim 17, wherein the state information also includes event control blocks for the client program.

21. The mainframe system of claim 17, wherein the source mainframe system is a first sysplex and the destination mainframe system is a second sysplex and the buffer is sent using TCP/IP.

\* \* \* \* \*

UNITED STATES PATENT AND TRADEMARK OFFICE
CERTIFICATE OF CORRECTION

PATENT NO. : 9,679,059 B2  
APPLICATION NO. : 14/943717  
DATED : June 13, 2017  
INVENTOR(S) : Dee et al.

Page 1 of 1

It is certified that error appears in the above-identified patent and that said Letters Patent is hereby corrected as shown below:

In the Claims

In Column 15, Claim 10, Line 51, delete:
"receiving a response".

In Column 15, Claim 10, Lines 52-54, delete:
"from the particular DB2 database subsystem; sending a buffer having the response from
the destination mainframe system to the source mainframe system; and"
And insert:
--receiving a response from the particular DB2 database subsystem;
sending a buffer having the response from the destination mainframe system to the
    source mainframe system; and-- therefore.

Signed and Sealed this
Third Day of October, 2017

Joseph Matal
*Performing the Functions and Duties of the*
*Under Secretary of Commerce for Intellectual Property and*
*Director of the United States Patent and Trademark Office*